United States Patent
Lamstein et al.

(10) Patent No.: US 7,565,884 B2
(45) Date of Patent: Jul. 28, 2009

(54) CAT SCRATCHER SYSTEM

(75) Inventors: Aaron Lamstein, San Rafael, CA (US); David Haaf, San Rafael, CA (US)

(73) Assignee: Worldwise, Inc., San Rafael, CA (US)

( * ) Notice: Subject to any disclaimer, the term of this patent is extended or adjusted under 35 U.S.C. 154(b) by 284 days.

(21) Appl. No.: 11/386,207

(22) Filed: Mar. 22, 2006

(65) Prior Publication Data

US 2006/0191490 A1    Aug. 31, 2006

Related U.S. Application Data

(63) Continuation-in-part of application No. 11/024,399, filed on Dec. 23, 2004.

(51) Int. Cl.
*A01K 29/00* (2006.01)

(52) U.S. Cl. ..................... 119/706

(58) Field of Classification Search ............... 119/161, 119/165, 166, 168, 601, 702, 706, 600, 673, 119/530, 527, 528, 529, 480; 209/373, 374, 209/417–419
See application file for complete search history.

(56) References Cited

U.S. PATENT DOCUMENTS

| | | | | |
|---|---|---|---|---|
| 3,100,474 A * | 8/1963 | Schneider | .................. | 119/166 |
| 4,030,448 A * | 6/1977 | Nuttall | ........................ | 119/165 |
| 4,117,804 A * | 10/1978 | Moore et al. | ................. | 119/166 |
| 5,363,808 A * | 11/1994 | Edwards | ...................... | 119/166 |
| 5,749,317 A * | 5/1998 | Richey et al. | ............... | 119/166 |
| 5,799,610 A * | 9/1998 | Poulos | ........................ | 119/166 |
| 5,983,831 A * | 11/1999 | Thompson | ................... | 119/165 |
| 6,167,840 B1 * | 1/2001 | White et al. | ............. | 119/61.53 |
| 6,382,351 B1 * | 5/2002 | Lastowski | ................... | 181/295 |
| 7,011,043 B2 * | 3/2006 | Diep | ........................... | 119/601 |

\* cited by examiner

*Primary Examiner*—Thomas Price (57) ABSTRACT

A cat scratcher system for providing at least one surface suitable for cat scratching. This system includes a shell being capable of accepting at least one cat scratching insert, the shell having sides, an opening for inserting and removing the first cat scratching insert and a top and bottom. At least one of the shell surfaces, such as the top, is further characterized as having an open region for displaying a first cat scratching surface of the insert to the exterior of the shell. The system contemplates the use of replaceable inserts used as current cat scratching surfaces become degraded upon use. These inserts can provide alternative cat scratching surfaces. The entire system can be employed in many diverse orientations by hanging it from a wall or door, lying it horizontally on a floor or bracing it diagonally between a floor and wall.

19 Claims, 11 Drawing Sheets

FIG. 15C

CAT SCRATCHER SYSTEM

RELATED APPLICATIONS

This is a continuation in part of U.S. application Ser. No. 11/024,399 filed on Dec. 23, 2004.

TECHNICAL FIELD

The present invention involves a cat scratching system for providing cat scratching surfaces of various types for use by domestic cats. This system includes a shell having an opening in which various cat scratching surfaces, alone, or in connection with supporting substrates can be inserted.

BACKGROUND OF THE INVENTION

It is well recognized that domestic cats crave scratching as part of their natural instinctive character. If a dedicated scratching surface is not provided, domestic cats will generally satisfy their need to scratch by turning to furniture, curtains and other articles which can be substantially damaged as a consequence. Often times, pet cats will not only climb over furniture, especially upholstered chairs and sofas, but will use such furniture and carpeting to condition their claws through deliberate and repeated clawing, pulling and tearing actions specifically with their fore paws. As noted, this clawing activity appears to be an irresistible natural impulse for cats and can be the source of great aggravation to the pet owner.

A number of vendors of pet and pet related products have offered dedicated scratching posts and surfaces in order to ameliorate this problem. Current devices consist of several alternative designs. A first group of cat scratchers consists of a rigid support covered with a plush surface such as rug or sisal. Such objects are generally in the shape of a post or beam which the cat can climb or otherwise engage during the clawing process. In that the plush surface is bonded to its support, once this surface has been compromised due to the cat's clawing action, the entire post or block must be discarded in its entirety.

Because of the unitary nature of prior cat scratching surfaces, if one wished to present a completely different surface to a cat simply because the cat favored an alternative surface or as a means of adding diversity to the scratching experience, one could not alter such a surface without discarding the entirety of the apparatus while replacing it with an alternative.

In addition, corrugated cardboard surfaces have been employed as scratchers. Many cats find cardboard preferable to carpeting as it is a soft material having corrugations that cats seem to enjoy. Also, the corrugated intersities in the cardboard surface can capture catnip thus further enhancing the scratching experience. However, as noted, corrugated cardboard is a relatively soft material which is easily destroyed with even modest cat scratching activity.

It is thus an object of the present invention to provide a cat scratcher system which can present different scratching surfaces to a domestic cat without the need to completely replace the entire system in order to do so.

A further object of the present invention is to provide a cat scratcher system in which various inserts can be employed to present new scratching surfaces to a pet without changing the entire system by simply changing inserts.

It is yet a further object of the present invention to provide a cat scratcher system in which various scratching surfaces can be replaced as they become compromised and worn without having to replace the entire system.

It is still a further object of the present invention to provide a cat scratcher system that can be installed and employed on a variety of surfaces, at a variety of angles and that make use of a multitude of attachment schemes.

These and further objects will be more readily apparent when considering the following disclosure and appended claims.

SUMMARY OF THE INVENTION

The present invention involves a cat scratcher system for providing at least one surface suitable for cat scratching. The system comprises an insert having at least one cat scratching surface in a shell. The shell is capable of accepting the insert and is characterized by having a top panel, a bottom panel and side panels, at least one of the panels being provided with an open region for displaying at least one cat scratching surface to the exterior of the shell. Further, at least one of the panels is capable of opening to provide access to the interior of the shell to enable the insert to be removably placed therein.

DETAILED DESCRIPTION OF THE INVENTION

Figure 1A:
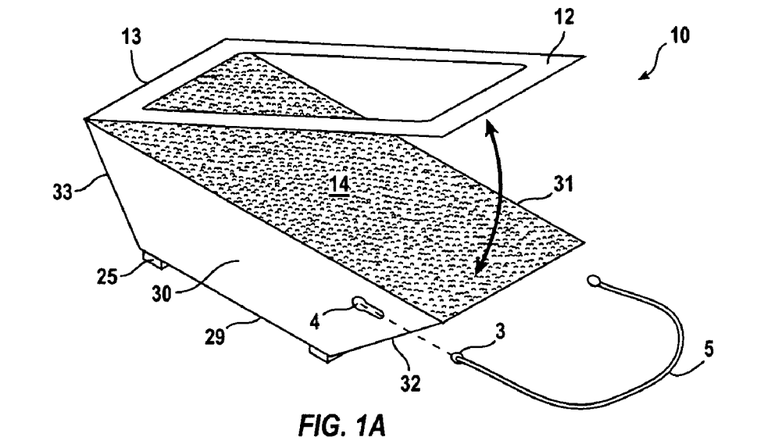
FIGS. 1A, 1B and 1C are prospective views of three suggested embodiments typifying the present invention.

FIGS. 1A, 1B, 1C and 13 show several iterations of the cat scratcher system of the present invention. Although the geometry of the system can be of any shape, FIG. 1A depicts cat scratcher system 10 including a shell having a substantially rectangular top 12 and bottom 29 as well as side panels 30 and 31 extending perpendicularly from top panel 12. In the embodiment shown in FIG. 1A, top panel 12 is hinged at seam 13 providing access to the interior of the shell. In this instance, cat scratching insert 14 is shown which can be introduced and removed from the interior of the shell when top 12 is swung open as shown. Hinging can be applied to any seam. For example, see FIG. 13 where hinge 1303 appears along the long edge of the cat scratcher system. The top of the shell can also be completely removable thus eliminating the need for a hinge altogether.

It is an essential component of the present invention to provide an outer shell which can be opened for the introduction of replaceable inserts either to provide a variety of surfaces or to replace cat scratching surfaces as they are worn. However, the present invention is not limited to the introduction of such inserts merely through employment of a removable top surface. Alternatively, as noted in FIG. 1B, cat scratcher system 101 can be employed wherein end panel 132 can swing through hinge 38 enabling insert 14 to pass within the outer shell bound by top surface 112, end panels 30 and 31 and bottom panel 29.

Figure 1B:
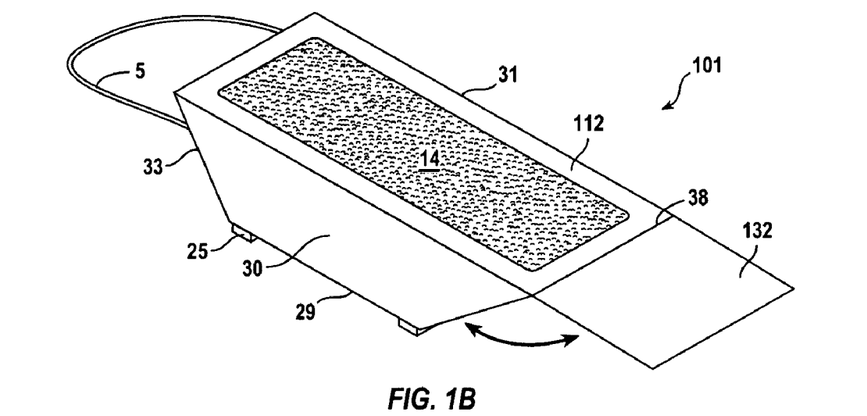
Figure 1C:
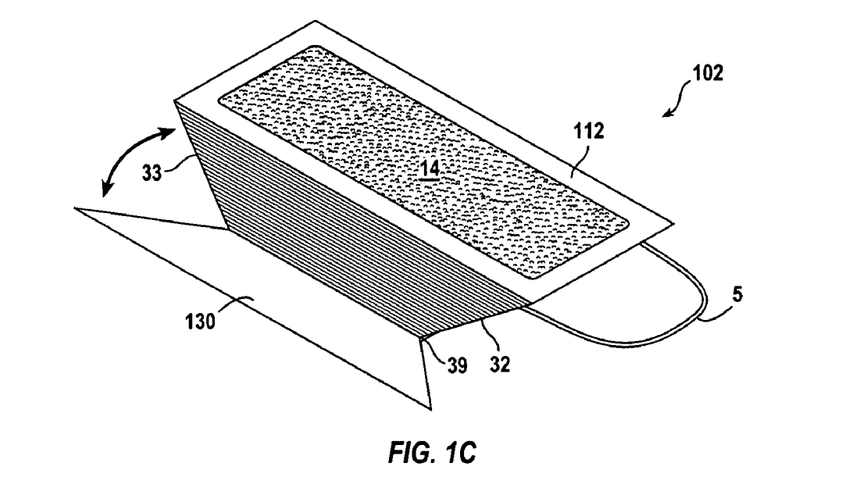

Similarly, as noted by reference to FIG. 1C, insert 14 can be introduced to cat scratcher system 102 by opening side panel 130 through hinge 39. Although not shown, insert 14 could also be introduced to the outer shell of a cat scratcher system by opening bottom panel 29 as an alternative to those embodiments shown in FIGS. 1A, 1B and 1C.

Once introduced, the outer shell can be closed to secure insert 14 displaying a suitable cat scratching surface to a pet by supporting the cat scratcher system on suction cups or other frictional supports 25 or hung from a doorknob or similar support through the use of rope, cord or plastic handle 5 or by other means discussed hereinafter. Rope, cord or plastic handle 5 can be optionally selectively removable. FIG. 1A depicts an example of this by providing key hole slots 4 and corresponding protrusions 3 although other attachment means and attachment locations can be made.

Further, although FIGS. 1A, 1B and 1C show the display of insert 14 only through an opening in the top surface of each shell, the present invention contemplates and thus embraces embodiments where each and every surface, including end panels, side panels or bottom panels, have openings to display suitable cat scratching surfaces. In doing so, a variety of such surfaces can be included in a single insert as discussed hereinafter with regard to FIGS. 10A-10G to provide variety, further noting that multiple surfaces will also prevent a single surface from being degraded prematurely.

Figure 11:
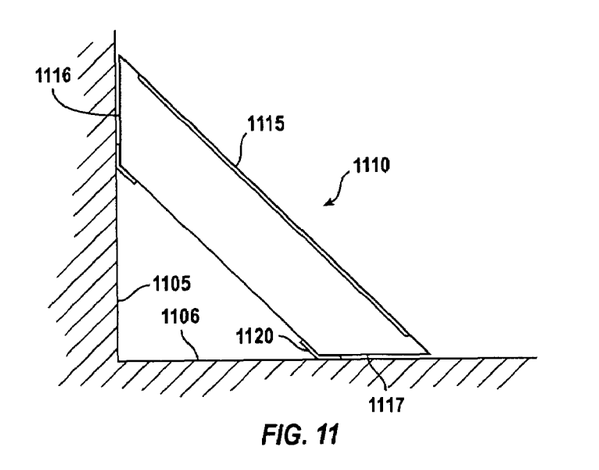
FIG. 11 is a side plan view of an embodiment of the cat scratcher system of the present invention employed in conjunction with a typical floor and perpendicularly extending wall support.

As additionally noted with regard to the embodiments of FIGS. 1A, 1B and 1C, end panels 32, 33 and 132 which extend between top panel 12/112 and bottom panel 29 are provided at an angle other than being perpendicular to the top panel and bottom panel. In this embodiment, the end panels ideally extend at an approximately 45 degree angle to the top panel to enable the cat scratcher system to diagonally bridge a horizontal floor and adjoining vertical wall. This embodiment is shown in FIG. 11 whereby cat scratcher system 1110 is shown diagonally bridging floor 1106 and wall 1105 to present a cat scratching surface 1115. As such, diagonally extending end panels 1116 and 1117 enable the 45 degree angular relationship between floor 1106, wall 1105 and cat scratching surface 1115 as illustrated. As a further embodiment, yet again referring to FIG. 11, cat scratcher system 1110 can be made to resist slippage from its intended orientation by providing rubber or plastic frictional strips 1120 against flooring 1106. These strips are shown as an embodiment of the present invention as strips 312 appended to bottom surface 311 of cat scratcher system 310 of FIG. 3B.

Figure 14:
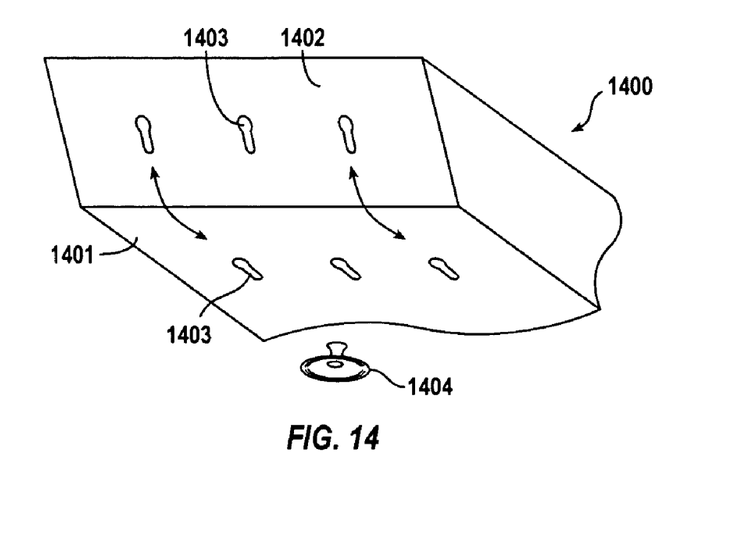
FIG. 14 is a partial perspective view showing a preferred embodiment of the present invention.

There are many alternative configurations for providing frictional elements to the exterior of a cat scratcher system shell in order to accomplish the goals of the present invention. For example, reference is made to FIG. 14 showing, in perspective, a partial shell having bottom 1401 and diagonally extending end panel 1402. Suction cups 1404 can be removably appended to key hole openings 1403 configured within bottom panel 1401 and side panel 1402. These optional suction cups help to keep the system from sliding when placed on a horizontal floor or hung from a vertical surface, such as a door knob. By providing suction cups 1404 as described, a single set of suction cups could be employed taking advantage of the removable feature described herein. This simply adds to the versatility of the present invention while minimizing the number of parts necessary in its implementation.

As noted, the shell of the present cat scratcher system can be of any such geometry. One such example of the present invention is shown in FIG. 13.

Figure 13:
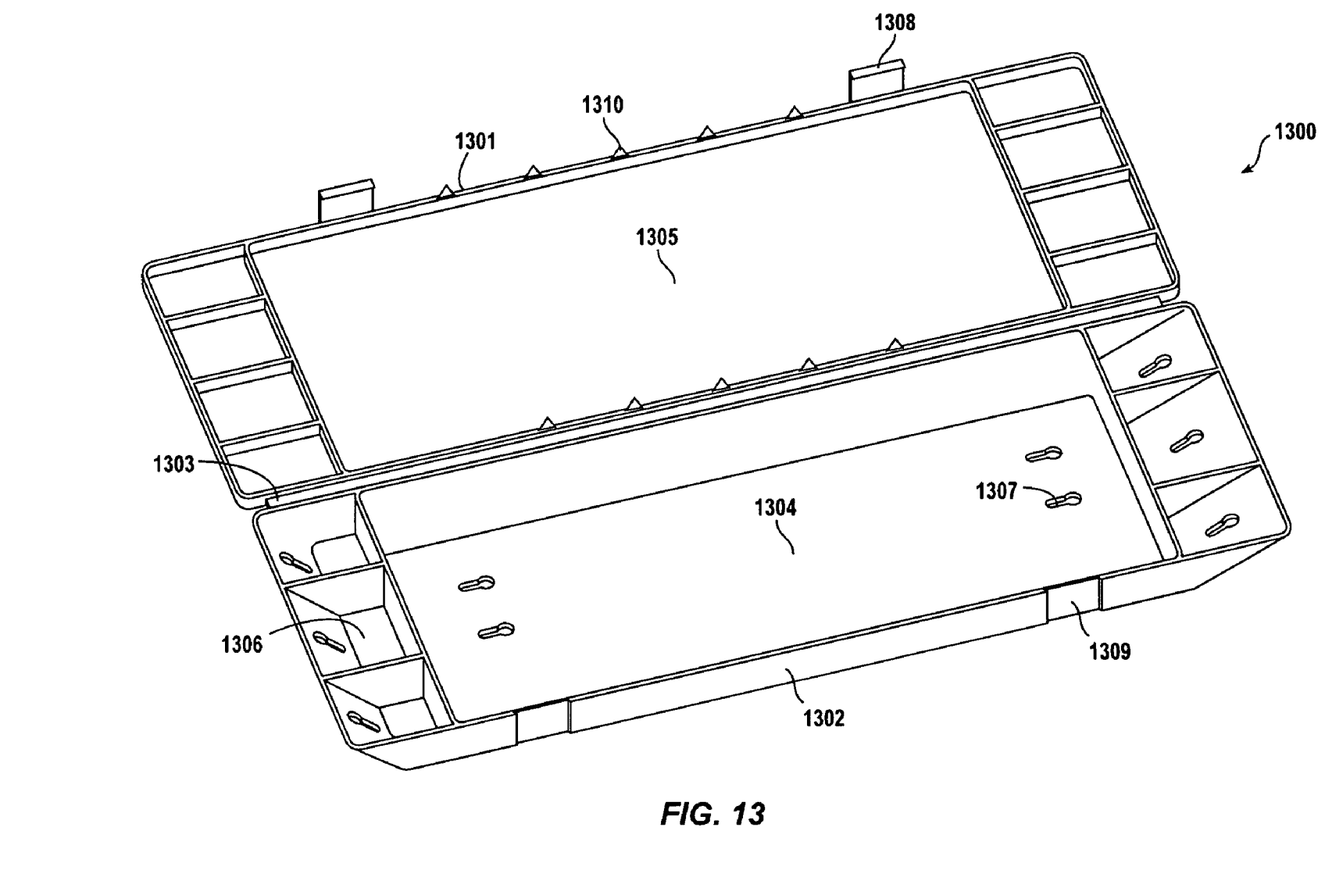
FIG. 13 is a perspective view of a further embodiment of the cat scratcher system of the present invention.

Turning to FIG. 13, cat scratcher system 1300 is depicted having top 1301 bordering open region 1305 through which a cat scratching surface is made accessible to a pet cat. Top 1301 can be hingedly connected through hinge 1303 to bottom portion 1302. Alternatively, top 1301 can be a separate part and then selectively removable from bottom 1302. The shell of cat scratcher system 1300 can be injection molded from a single plastic charge such that hinge 1303 is a "living hinge" contiguous with top 1301 and bottom 1302. Alternatively, traditional pin hinges can be employed and, as stated previously, top 1301 could be completely removable from the shell to provide access to its interior for insert installation and removal.

It is noted that cat scratcher system 1300 employs insert receptacle region 1304 which is substantially rectangular. As such, inserts such as 1010 (FIG. 10A) would be ideally suited for use herein. Further, carpet or sisal insert 1020 (FIG. 10B) can be situated within insert receiver region 1304 but, in that case, a spacer to maintain a tight frictional fit of the insert within cat scratcher system 1300 would be employed. The use of spacers is further illustrated with respect to FIG. 15.

It is interesting to note that top 1301 is hingedly connected to bottom 1302 along the lengthwise edge of cat scratcher system 1300. This further illustrates, in comparison to FIG. 1A, the myriad of possible ways in which the interior of a cat scratcher system shell of the present invention can be accessed while remaining within the spirit and scope of this disclosure. In addition, the preferred embodiment of FIG. 13 offers a user a certain degree and convenience not shared by other embodiments disclosed herein. For example, in that insert receiving region 1304 is smaller than the outer perimeter of cat scratching system 1300, unused regions such as 1306 can act as receptacles for a myriad of useful subparts. For example, cat nip could be applied to area 1306 thus placing the cat nip proximate to any insert placed within insert receiving region 1304 while preventing direct access to the cat nip when top 1301 is closed upon 1302. Once closed, securing tabs 1308 can engage regions 1309 snap fitting in place thus selectively preventing a cat from gaining access to whatever is in region 1306. Further, region 1306 could be used to contain attachment hardware used to releaseably append the cat scratcher system to a suitable support. In this regard, reference is made to FIGS. 4A, 4B and 5.

Figure 2A:
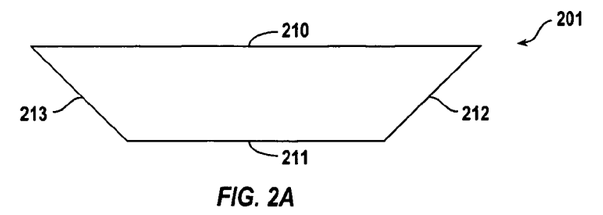
FIGS. 2A-2E are side and end views of shell geometries which typify the myriad of embodiments embracing the present invention.
Figure 2B:
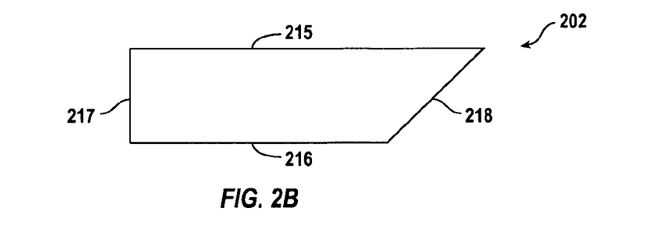

Turning to FIG. 2, FIG. 2A depicts a side view of the geometry of the shell of FIGS. 1A, 1B and 1C by providing shell 201 having top surface 210, bottom surface 211 and end panels 212 and 213 extending, ideally, at a 45 degree angle from the top and bottom surfaces as illustrated. However, as noted in FIG. 2B, shell 202, including top surface 215, bottom surface 216 and end panels 217 and 218 can be provided in which end panel 217 is perpendicular to top panel 215 and bottom panel 216 while end panel 218 can have substantially the same angular orientation as panel 212 of FIG. 2A. Such an embodiment can also be used in the orientation depicted in FIG. 11 whereby end panel 218 would lie against floor 1106 and end panel 217 would simply lean against wall 1105 without being flush thereto. It is important to note that FIGS. 2A and 2B are illustrative of simply two geometrical configurations as being examples of the present invention. Certainly, these examples are simply illustrative noting that the various outer surfaces of the shell of the scratcher system of the present invention can take on virtually any suitable shape or orientation while remaining within the spirit and scope of the present invention.

Figure 2C:
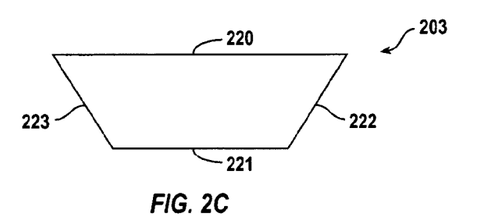
Figure 2D:
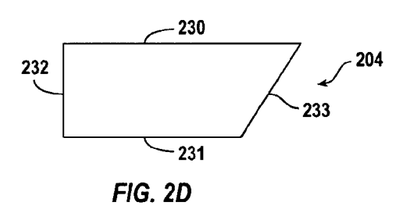
Figure 2E:
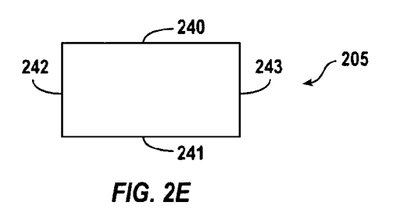

Similarly, the sidewalls of the shell of the scratcher system of the present invention can also be configured in a multitude of angular relationships including rounded surfaces creating suitable geometries. In this regard, reference is made to FIGS. 2C, 2D and 2E which are end views of scratcher systems exemplifying some, but not all of such choices. For example, turning to FIG. 2C, top surface 220 and bottom surface 221 can be configured substantially parallel to one another while side panels 222 and 223 can angle between these top and bottom surfaces in creating scratcher system 203. These angular relationships can again, ideally, be at approximately 45 degrees to parallel top and bottom surfaces 220 and 221 to enable cat scratcher system 203 to again bridge a suitable floor and adjoining perpendicular wall while diagonally bridging these surfaces. As noted with regard to FIG. 2D, cat scratcher surface 204 having substantially parallel top and bottom surfaces 230 and 231 can be connected by perpendicularly extending side panel 232 and angularly extending side panel 233. Finally, cat scratcher system 205, shown in FIG. 2E, can be provided with a box-like perimeter whereby top and bottom surfaces 240 and 241 are connected by perpendicularly extending side panels 242 and 243. The embodiment of FIG. 2E can embrace that embodiment shown in FIGS. 1A, 1B and 1C.

Figure 3A:
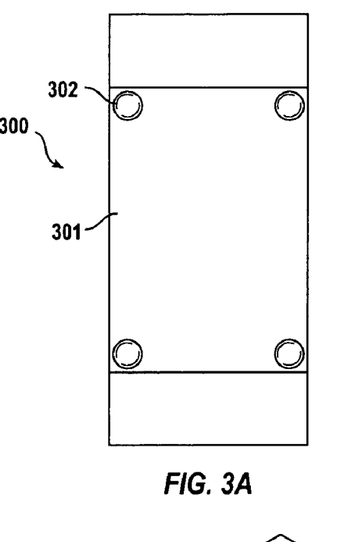
FIGS. 3A and 3B are bottom plan views showing alternative slip resistant supports for the cat scratcher system of the present invention.
Figure 3B:
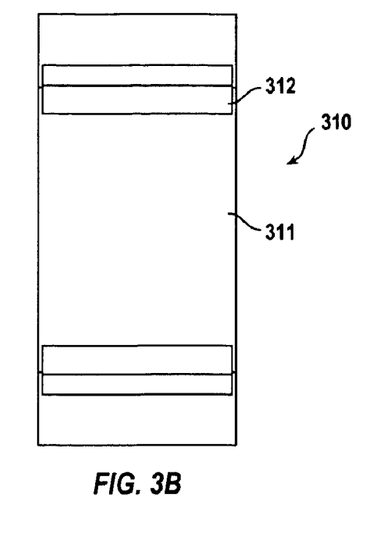

As previously noted, FIGS. 3A and 3B are bottom plan views of typical cat scratcher systems of the present invention. Turning first to FIG. 3A, cat scratcher system 300 having bottom surface 301 is shown with plastic or rubber feet or suction cups 302 which help the present invention from sliding on a supporting surface as a cat engages the cat scratcher system as intended. Suction cups such as supports 302 can support cat scratcher system 300 on a horizontal floor or can act as high friction stabilizing elements when the cat scratcher system is hung vertically from a doorknob or similar support through the use of removable cord 5 (FIG. 1). Such suction cups can also be repositionable or removable altogether as shown in FIG. 14. As an alternative, cat scratcher system 310, having bottom surface 311, can employ one or more high friction strips 312. Such strips are particularly advantageous when using the cat scratcher system in the embodiment shown in FIG. 11, as discussed previously. Clearly, high friction strips 312 are deployed in the configuration of FIG. 11 as high friction strips 1120 noting that they ideally bridge a portion of the bottom and side walls of a suitable cat scratcher system or can be applied to only the angled end surfaces if desired. Repositioned suction cups 302 (1404 of FIG. 14) can be moved to surface 1116 (FIG. 11) for the same purpose.

Figure 4A:
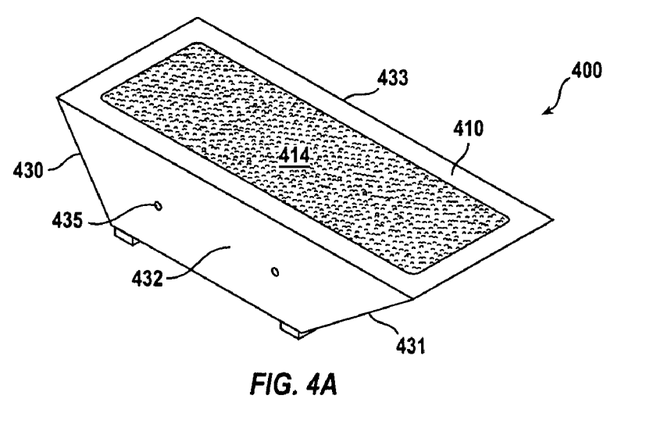
FIGS. 4A and 4B are prospective and bottom plan views of yet another embodiment of the cat scratcher system of the present invention.
Figure 4B:
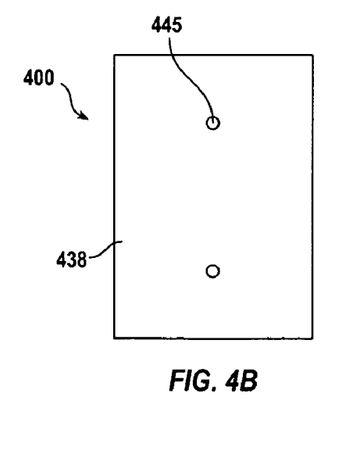
Figure 5:
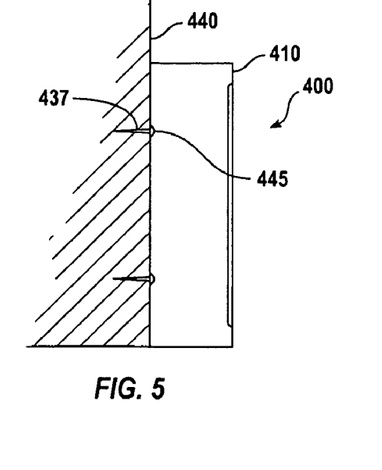
FIG. 5 is a side plan view showing one of the various attachment protocols while employing the embodiment shown in FIGS. 4A and 4B hereof.

Turning to FIGS. 4A and 4B, cat scratcher system 400 is depicted having a top surface 410, insert 414, side panels 432 and 433 as well as sloping end panels 430 and 431. This embodiment depicts yet a further alternative for attaching a suitable cat scratching system to a support structure. As an option, cat scratcher system 400 can be provided with openings 435 for enabling a screw or nail to pass through side wall 432 and into a suitable supporting structure such as wall 440 or even other related products such as self-supporting cat scratching posts. Screw, nail or other attachment means 437 can be anchored to the interior of cat scratcher system 400 by any suitable means such as through the use of a screw with an expanded head region 445 whereby the body of attachment means 437 can pass through opening 435 but not its expanded end 445.

Although the embodiment as depicted in FIGS. 4A and 4B show openings 435 configured solely within side wall 432, similar openings could be created in any of the shell surfaces. In fact, it is contemplated that all of these surfaces could be produced having weakened scored areas where a user could simply employ one's thumb, a pin or nail to push the scored or weakened areas from their suitable side wall creating an open region equivalent to openings 435 in virtually any of the walls of the shell material to enable the cat scratcher system to be anchored to any suitable support structure, be it a floor, wall or beam. As a further embodiment, reference is again made to FIG. 13 showing keyhole openings 1307 which are configured within insert receiving region 1304 and thus not visible once a suitable insert is installed therein. Keyhole openings 1307 are familiar to most people in that they are intended to receive a broadened screw head within the larger open region of the keyhole and, once installed, the cat scratcher system can be moved to a small degree so that the expanded screw head passes within the more narrow region of keyhole opening 1307 thus releaseably securing the cat scratcher system to a suitable wall or floor.

As most cat owners are well aware, cats often times can become quite agitated and aggressive in using cat scratching pads and similar surfaces, particularly when enhancements such as catnip are employed. Further, some cat scratching surface inserts 14, such as carpet or sisal, are prone to dislodgement from their exposed open region. As such, to assist in preventing dislodgement of cat scratching insert 14, various physical embodiments are envisioned for incorporation herein.

Figure 6A:
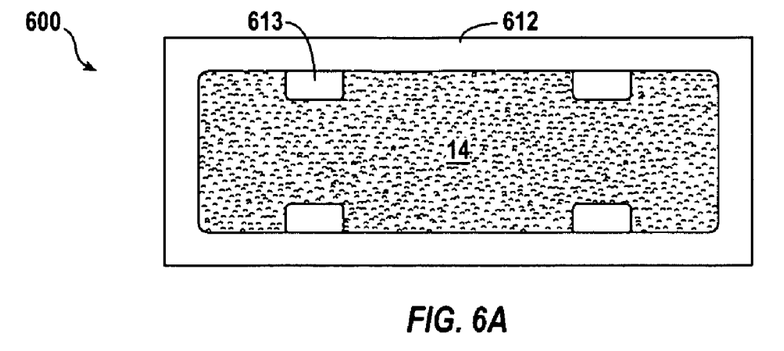
FIGS. 6A-6C are top plan views of different embodiments of the cat scratcher system of the present invention.
Figure 6B:
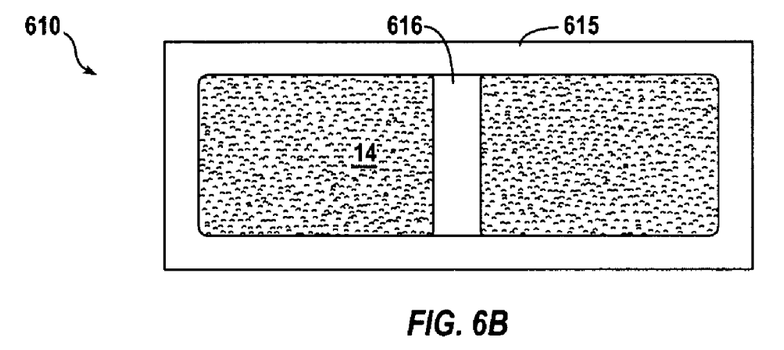
Figure 6C:
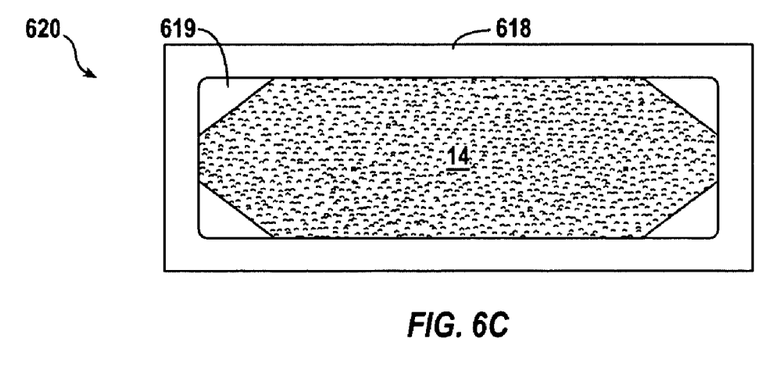

Specifically, in referring to FIGS. 6A-6C, cat scratcher system 600 is provided with a top surface 612, the border of which is intended to extend beyond the periphery of cat scratching insert 14 which assists in preventing dislodgement. In addition, one or more tabs 612 can be configured to extend from border region of top surface 612 to further hold down cat scratching insert 14.

In addition to tabs 613, other dislodgement-prevention alternatives can be employed. For example, FIG. 6B shows cat scratcher system 610 whereby bridge 616 can extend and thus connect opposite edges of top surface 615 to hold cat scratching insert 14 in position. Yet a further alternative is shown in FIG. 6C whereby corner pieces 619 can extend diagonally as shown with regard to top surface 618 of cat scratching system 620. FIG. 13 also depicts a series of protrusions 1310 molded into top 1301 which embed into an insert and thus help to resist movement. In practice anyone skilled in the art would appreciate the fact that these are a limitless arrangement of tabs and tab locations useful to accomplish the goals of FIGS. 6A-6C, above.

Figure 7A:
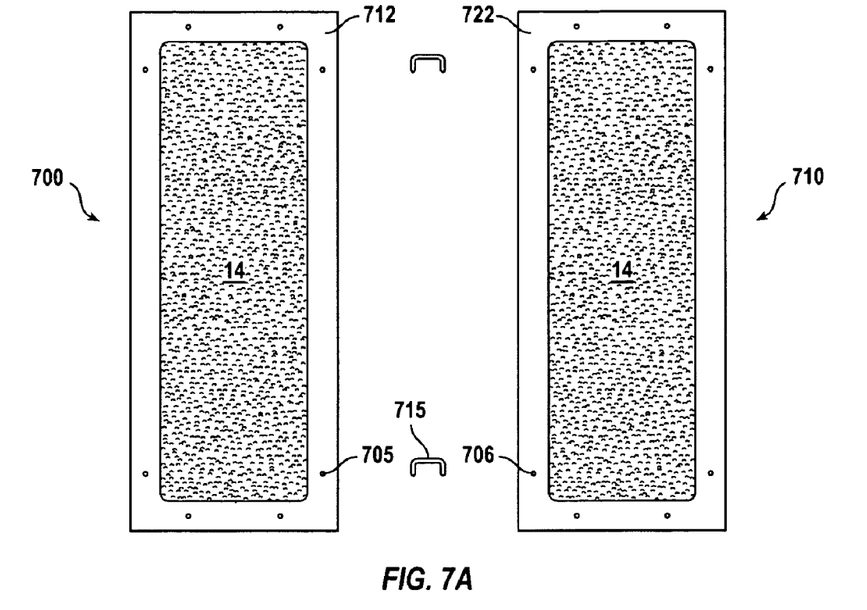
FIGS. 7A-7E are top plan views showing how multiple cat scratcher modules can be joined to increase the flexibility of the present invention.
Figure 7B:
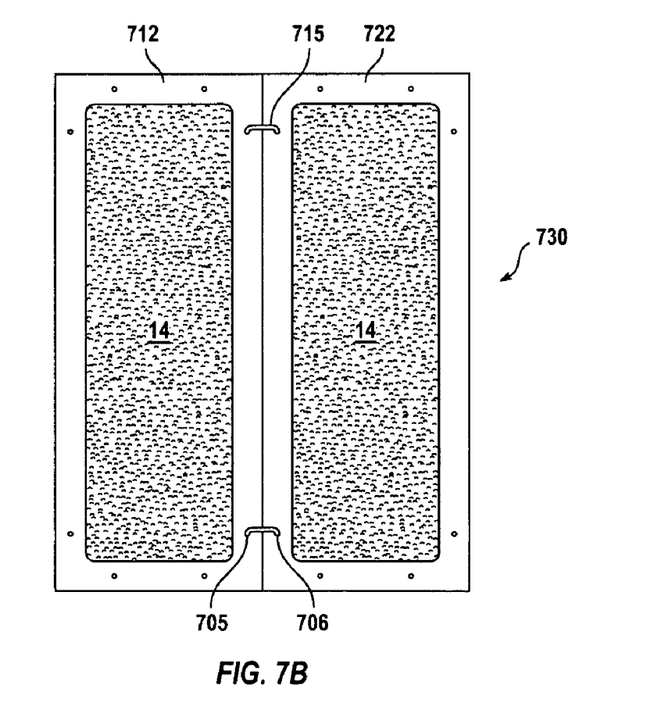
Figure 7C:
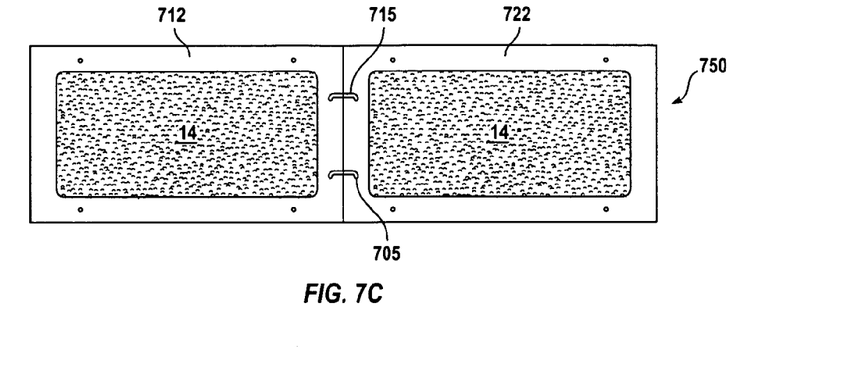
Figure 7D:
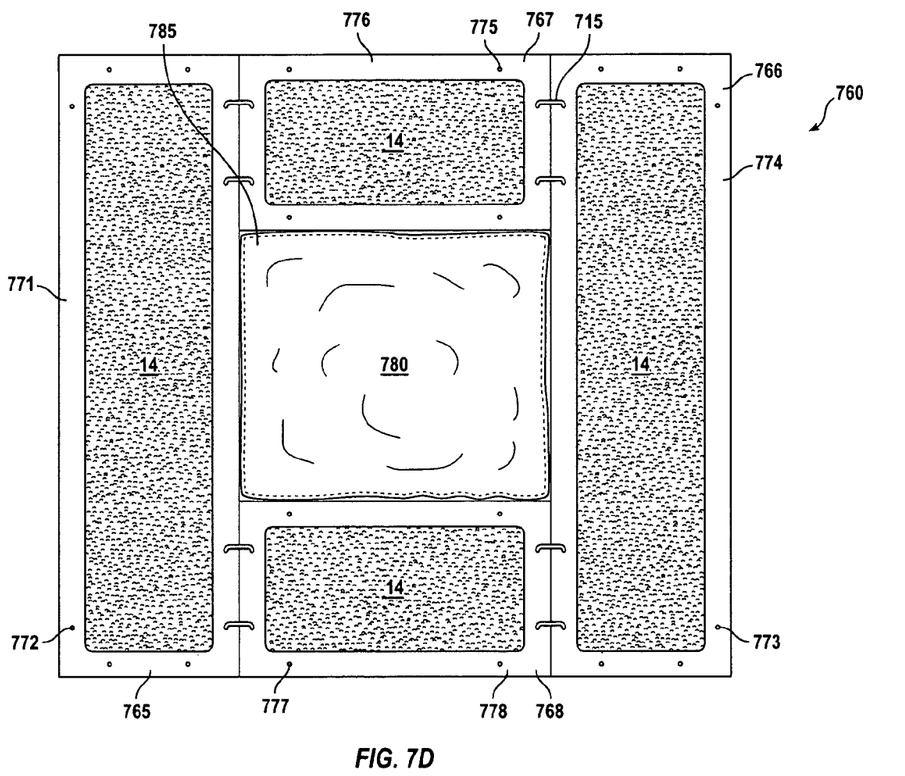

A further embodiment of the present invention is shown in FIGS. 7A-7E. Referring first to FIG. 7A, cat scratcher systems 700 and 710 are shown wherein at least one panel of each shell is provided with openings 705 and 706 for receiving bridging means 715. The positioning of openings 705 and 706 and the size of bridging means 715 are such that cat scratching system 700 and 710 can be releaseably joined to one another in creating unitary cat scratching insert 730 as shown in FIG. 7B. In doing so, top surfaces 712 and 722 form a planar surface exposing two cat scratching inserts 14. In demonstrating the flexibility of this embodiment, FIG. 7C depicts the joining of the same two cat scratcher systems 700 and 710 along their shorter edges to produce unitary cat scratcher system 750 as shown. Such bridging hardware could also be included within storage region 306 of the cat scratcher system 1300 as depicted in FIG. 13.

Figure 7E:
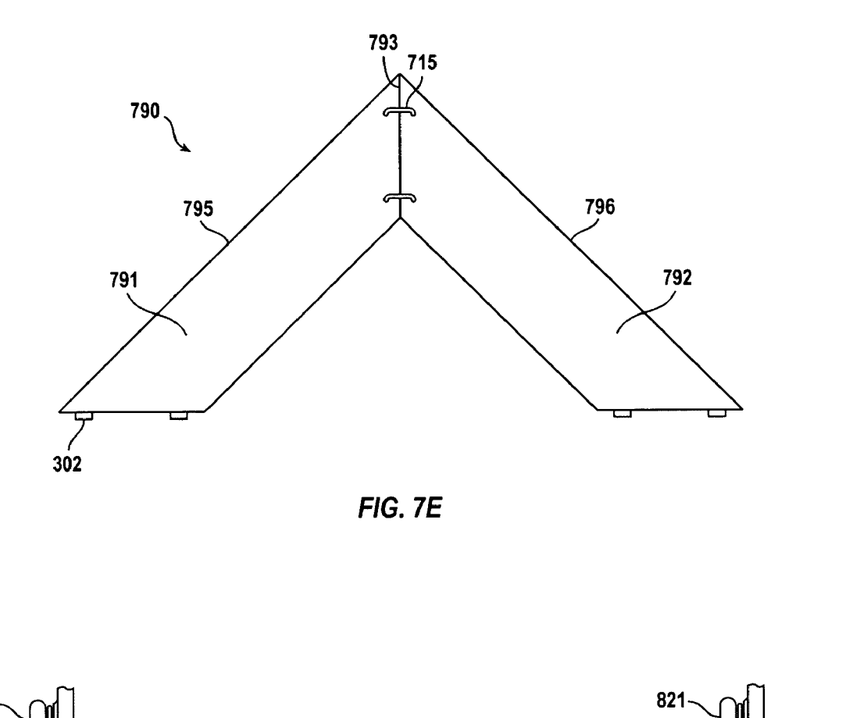

Yet a further example of joining two cat scratcher systems is shown in FIG. 7E. In this instance, self supporting structure 790 is created by joining cat scratcher systems 791 and 792 along their common edge 793, shown to be configured at 45° angles to the long axes of each 791 and 792 system. Bridging means 715 can be used as in previously-discussed embodiments and suction cups 302 employed to resist movement of self supporting structure 790 when in use. Cat scratching surface 795 and 796 are thus presented for use by a cat as intended herein.

The concept of bridging and thus releaseably joining individual cat scratcher systems to provide multi-unit unitary structures enables a pet supplier to produce a wide variety of creative embodiments. For example, reference is made to FIG. 7D whereby unitary structure 760 is shown whereby cat scratcher systems 765, 766, 767 and 768 are joined by bridging openings 772 in top surface 771, 773 in top surface 774, 775 in top surface 776 and 777 in top surface 778. Multiple bridging means 715 can be applied as shown creating a structure having four cat scratcher subsystems, each having its own cat scratching inserts 14 and a central region 780 configured as shown. As an example as to how such a structure could be employed and not intending to limit any particular end use, open region 780 could be provided with a cushioning material such as a pillow or other typical pet bedding surface so that the unitary cat scratcher system 760 can actually function as a pet bed providing not only a comfortable sleeping environment but also cat scratching surfaces as shown.

Figure 8A:
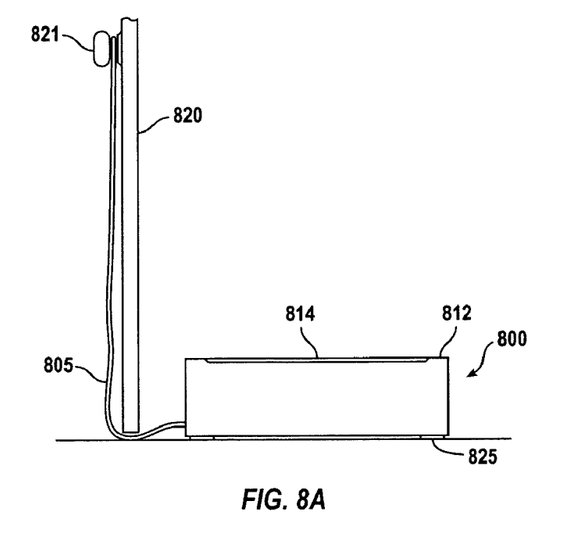
FIGS. 8A and 8B are side plan views showing the securing of the cat scratcher system of the present invention in the vicinity of a door as a further illustration of the use of the present invention.
Figure 8B:
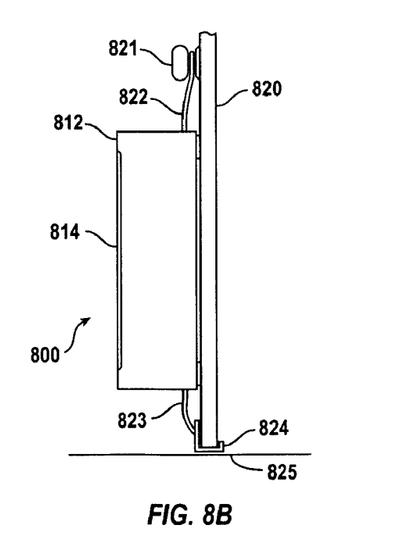

As noted previously with regard to FIG. 1, the cat scratcher system of the present invention can employ a number of varying alternatives in securing the system in a predetermined location thus preventing it from inadvertently being dislodged or relocated through aggressive pet-related activities. For example, FIG. 1 shows the use of removable cord 5 which could engage a doorknob thus enabling the cat scratcher to be hung from a suitable door. FIGS. 8A and 8B further illustrate other configurations among the myriad of alternatives which would become quite apparent to those skilled in the art upon reviewing the present disclosure.

Turning to FIG. 8A, cat scratcher system 800 is shown residing on a horizontal floor supported by feet 825, thus displaying top surface 812 and open region 814 which would enable a cat to gain access to a cat scratching surface (not shown). In order to maintain cat scratcher system 800 in place, cord 805, appended to an end panel of the cat scratcher system shell can be caused to pass beneath door 820 and suitably connect to doorknob 821 by simply providing a looped end to cord 805. Once door 820 is closed, the range of movement of cat scratcher system 800 is limited by the length of cord 805.

A further variation to the embodiment shown in FIG. 8A is depicted in FIG. 8B. In this instance, cat scratcher system 800 is shown vertically hung from doorknob 821 using plastic handle, rope or cord 822. The back surface of cat scratcher system 800 abuts vertically extending door 820 enabling open region 814 to be accessible to an engaging pet. In order to maintain the orientation of cat scratcher system 800, yet a further cord 823 could be appended to U-shaped bracket 824 as shown. The U-shaped bracket is appended to cord 823 and is sized to slip beneath door 820 and engage door 820 within its U-shaped region. It is noted that cords 822, 823 and U-shaped bracket 824 could be provided to a customer when the cat scratcher system 800 was sold.

Figure 9A:
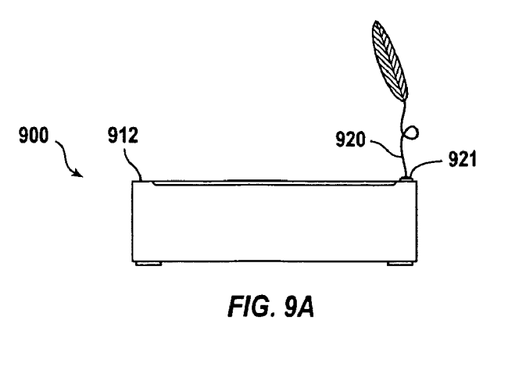
FIGS. 9A and 9B are side and partial side views showing yet another embodiment of the present invention and the incorporation of a swat toy in conjunction therewith.
Figure 9B:
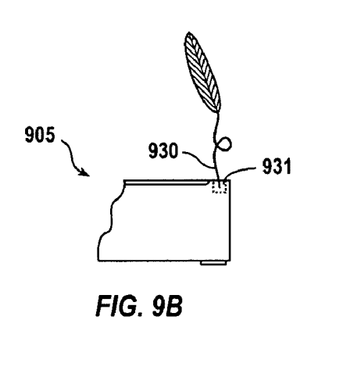

The cat scratcher system of the present invention can also be employed to display other cat attracting devices to enhance a pet's interest level. For example, reference is made to FIGS. 9A and 9B showing cat scratcher systems 900 and 905. In each instance, top surface 912 and 931, respectively, are provided with swat toys 920 and 930. Such toys are common in the pet toy marketplace whereby feathers or similar attractants can be suspended on a support to provide a bouncing movement to the feathers as they are swatted by a playful cat. As shown in FIG. 9A, such a swat toy could be appended to top surface 912 by use of a simple hook and loop fastener 921. Alternatively, as shown in FIG. 9B, a potting material 931 can be supplied beneath the top surface of the cat scratcher system so that swat toy 930 can be extended through this top surface and into potting material 931 as needed. In each instance, the cat scratcher system could be employed without swat toys 920 and 930 and the present invention further contemplates the ability to replace such toys as they degrade through use while maintaining the cat scratcher system as originally provided.

Throughout the present discussion, reference has been made to inserts suitable for use in the present cat scratcher systems. All such inserts are related to one another in that each must have at least one textured or porous surface which can present itself through an opening in the shell of the cat scratcher system and be suitable for facilitating cat scratching activity. Such materials include carpet, sisal and corrugated cardboard. Such materials enable a cat to extend its claws and perform its inherent cat scratching activity without harm being inflicted on the cat as a result. Typical inserts for use herein are shown, by example, in FIGS. 10A-10G.

Figure 10A:
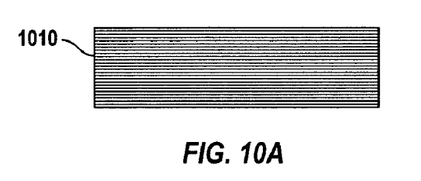
FIGS. 10A-10G illustrate, in side plan views, various embodiments of inserts for use in the cat scratcher system of the present invention.
Figure 10B:
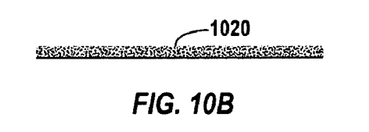

FIG. 10A shows a solid block of corrugated cardboard 1010. Such an insert could be installed within any of the cat scratcher systems described above where the top surface of corrugated cardboard block 1010 would be presented as the cat scratching surface. Such a physical embodiment would be ideal for use in cat scratcher system 1300 of FIG. 13. As an inherent advantage in practicing the present invention, once corrugated cardboard insert 1010 was abraded through use as a cat scratching medium, it could be removed from the shell of the cat scratcher system and turned upside down to present a fresh surface for continued cat scratching activity. As such, through the use of the present invention, a single insert such as cardboard block 1010 could, in essence, double the life of the replaceable insert without added cost being imposed upon the pet owner. In addition, once both top and bottom surfaces of cardboard block 1010 were sufficiently degraded so that its use as a cat scratching insert was no longer viable, the pet owner could simply purchase a new insert while retaining the outer shell and other elements of the cat scratcher system, thus reducing costs in providing a pet with a continuous, cat scratching medium.

As noted previously, an alternative cat scratching surface can constitute carpet or sisal. In this regard, reference is made to FIG. 10B where cat scratching insert 1020 is shown. Obviously, if carpet or sisal 1020 was employed solely as a cat scratching medium, the sidewalls of the cat scratcher system would be very shallow to frictionally engage such a relatively thin medium.

Figure 10C:
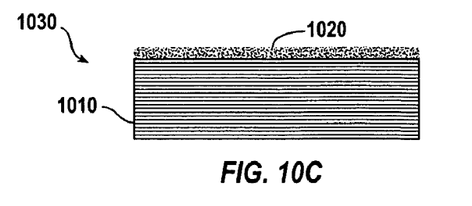

In order to standardize the depth of the cat scratching system of the present invention and also to add flexibility to the inserts for use herein, reference is made to FIG. 10C showing a composite structure. In this example, insert 1030 can be composed of the stacking of carpet or sisal 1020 and cardboard block 1010. In doing so, the full depth of a standard cat scratcher system could be occupied while providing a carpet or sisal surface to the pet. In addition, insert 1030 could be flipped upside down so that cat scratching surface could constitute either the carpet 1020 or the outer layer of corrugated cardboard block 1010 to provide diverse cat scratching surfaces to engage a pet and take advantage of its natural curiosity. It is also contemplated that the present invention could employ a quantity of catnip within inserts and, in referring once again to FIG. 10C, such catnip could be placed within the interstices of corrugated cardboard block 1010 while preventing a cat from directly gaining access to it by providing carpet or sisal 1020 as a barrier. The pet would still receive stimulation from the catnip odor emanating from the cat scratcher system of the present invention in this embodiment.

Figure 10D:
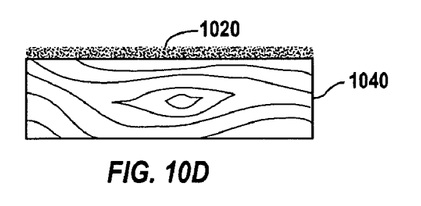
Figure 10E:
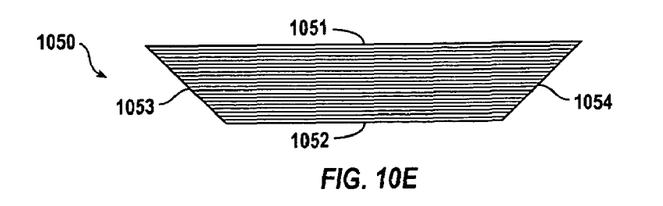
Figure 10F:
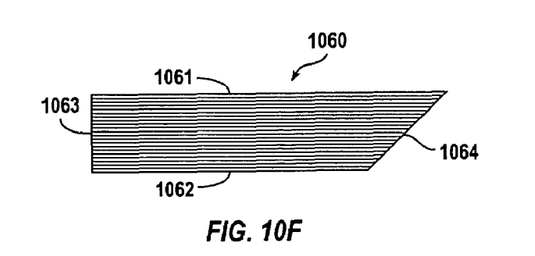

In some instances, a user of the present invention may find it beneficial to provide only a carpet or sisal surface to the engaged pet but wishes to do so in the standard cat scratcher system discussed above having a depth great enough to receive significantly sized inserts. For example, carpet or sisal would present a much more durable surface than, for example, a surface of corrugated cardboard. In such an instance, as shown in FIG. 10D, sisal 1020 could be mounted upon wooden block 1040, the latter acting only as a spacer and rigid support for the cat scratching surface of carpet or sisal 1020.

Figure 12:
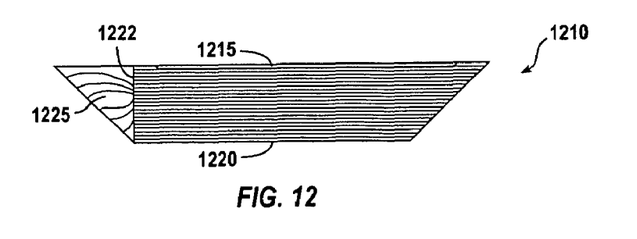
FIG. 12 is a side cross-sectional view of yet a further embodiment of the cat scratcher system of the present invention.

Regardless of the composition of any insert for use herein, its geometrical configuration and orientation can be selected among a myriad of choices, none of which limiting the scope and reach of the present invention. For example, turning to FIG. 10E, insert 1050 having substantially parallel top and bottom surfaces 1051 and 1052 is provided with sloping end walls to fit snugly in, for example, the cat scratcher systems of FIGS. 1 and 11. Alternatively, the insert of FIG. 10F again having top and bottom substantially perpendicular cat scratching surfaces 1061 and 1062 has one end wall 1064 sloping at, preferably, a 45 degree angle between the top and bottom surfaces and a substantially parallel end wall 1063. Such insert 1060 could be employed in, for example, the cat scratcher system of FIG. 1 but, in doing so, ideally, a spacer would be employed to ensure a snug fit between insert 1060 and the outer shell of the cat scratcher system. In this regard, reference is made to FIG. 12 wherein spacer 1220 is shown within a shell of the cat scratcher system of FIG. 1. Spacer 1220 exposes a cat scratching surface through open region 1215. Sloping sidewall 1210 is intended to abut and be snugly retained by sloping side 32. However, in this instance, spacer 1225 composed of any suitable material, such as a wooden block, could abut the vertical edge 1222 of spacer 1220, again, providing a snug fit within the outer shell material. This embodiment illustrates the wide latitude that a user would have in employing inserts of various geometrical dimension into standard shell configurations of the present cat scratcher system.

Figure 15A:
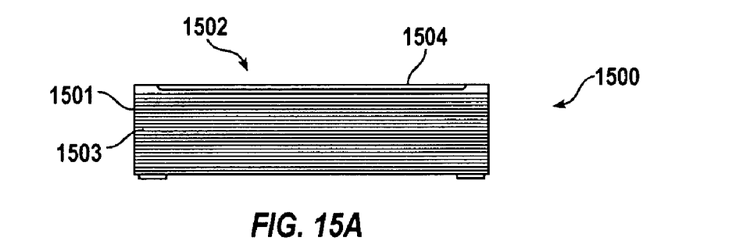
FIGS. 15A, B and C are crossectional views illustrating the use of a spacer to insure a snug fit of an insert within the shell of the present invention.
Figure 15B:
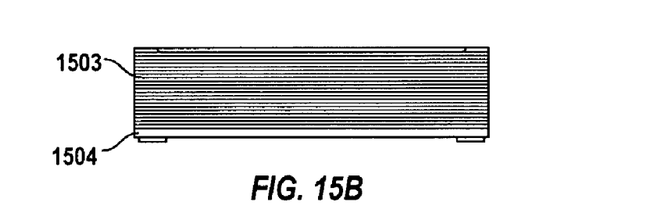
Figure 15C:
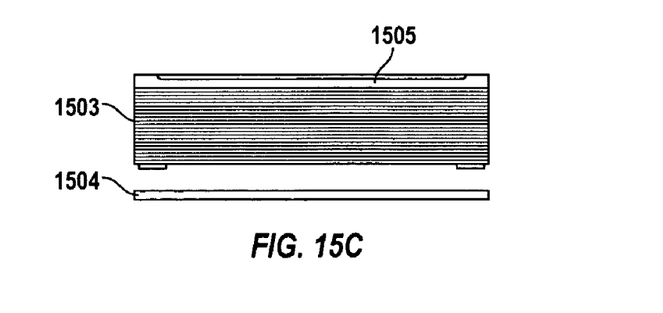

Providing a snug fit between an outer shell and cat scratching inserts is somewhat important in practicing the present invention for cats tend to be quite aggressive in their clawing action as it is a natural tendency on the part of a cat to attempt to pull an insert from the securing shell body. In this regard, reference is made to FIG. 15A-15C. Specifically, shell 1501 is shown in side cross sectional view having open region 1502 for exposing a suitable insert to a pet. When sold, it is contemplated that a functional insert, such as corrugated block 1503 is situated below a suitably sized cardboard element 1504. Such a configuration is particularly advantageous as instructions and other consumer related information could be printed directly upon cardboard element 1504 and viewed through opening 1502. If catnip is placed within the intersities of corrugated insert 1503, cardboard element 1504 would also prevent the catnip from spilling from the interior of shell 1501. If no other functional insert other than corrugated block 1503 was employed as a cat scratching medium, cardboard element 1504 could be repositioned below corrugated insert 1503 as shown in FIG. 15B to maintain a snug, slip free insert. However, if one wished to place, for example, sisal 1505 above corrugated insert 1503, cardboard element 1504 could simply be removed as sisal 1505 would occupy space within shell 1501 that was previously occupied by cardboard element 1504 as shown in FIG. 15C. Also, users may at a later time, employ other inserts that may not be thick enough to occupy the entire shell height. In such instances, the cardboard element can be used to take up interior shell volume.

Figure 10G:
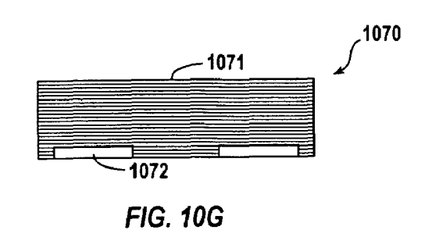

As noted previously, it is contemplated, as a preferred embodiment, that the cat scratcher system of the present invention have the ability to retain catnip or other odor or fragrance emanating sources to enhance the attractiveness of the cat scratching surface. For example, catnip could be embedded within the interstices of a suitable corrugated cardboard insert as such corrugations would be well suited to receive catnip leaves and is porous enough to allow vapors emanating from the catnip to become discernable by the pet employing the present cat scratcher system. As a further embodiment, as shown in FIG. 10G, a corrugated cardboard insert 1070 having body 1071 could be provided with cutout regions 1072 acting as reservoirs for receiving catnip or other odor emanating fragrances. In such instances, the catnip within reservoirs 1072 would be well separated from the outer cat scratching surface. In addition, as the effects of the catnip dissipate, it would be a relatively easy task to remove insert 1070 while disposing of spent catnip within reservoirs 1072 and replacing it with a fresh supply.

The invention claimed is:

1. A eat scratcher system for providing at least one surface suitable for cat scratching, said system comprising an insert having at least one cat scratching surface and a shell, said shell being capable of accepting said insert, said shell further having a top panel, a bottom panel and side panels, at least one of said panels being provided with an open region for displaying said at least one cat scratching surface to the exterior of said shell and access being provided to the interior of said shell to enable said insert to be repositioned and removably placed therein and wherein said shell is further characterized as having a border surrounding said open region to substantially resist removal of said insert from said open region and wherein said open region is configured within said top panel for displaying said cat scratching surface therethrough and further wherein said border is provided with an open region for displaying a second cat scratching surface to the exterior of said shell.

2. The cat scratcher system of claim 1 wherein said first and second cat scratching surfaces comprise members selected from the group consisting of carpet, sisal and corrugated cardboard.

3. A cat scratcher system for providing at least one surface suitable for cat scratching, said system comprising an insert having at least one cat scratching surface and a shell, said shell being capable of accepting said insert, said shell further having a top panel, a bottom panel and side panels, at least one of said panels being provided with an open region for displaying said at least one cat scratching surface to the exterior of said shell and access being provided to the interior of said shell to enable said insert to be repositioned and removably placed therein and wherein said shell is further characterized as having a border surrounding said open region to substantially resist removal of said insert from said open region and wherein said border further comprises a plurality of protrusions sized to embed said insert to resist movement of said insert when said cat scratcher system is in use.

4. A cat scratcher system for providing at least one surface suitable for cat scratching, said system comprising an insert having at least one cat scratching surface and a shell, said shell being capable of accepting said insert said shell further having a top panel, a bottom panel and side panels, at least one of said panels being provided with an open region fin displaying said at least one cat scratching surface to the exterior of said shell and access being provided to the interior of said shell to enable said insert to be repositioned and removably placed therein and wherein said shell is further characterized as having a border surrounding said open region to substantially resist removal of said insert from said open region wherein corner pieces are provided extending into said open region to substantially resist removal of said cat scratching insert from said open region.

5. A cat scratcher system for providing at least one surface suitable for cat scratching, said system comprising an insert having at least one cat scratching surface and a shell, said shell being capable of accepting said insert, said shell further having a top panel, a bottom panel and side panels, at least one of said panels being provided with an open region for displaying said at least one cat scratching surface to the exterior of said shell and access being provided to the interior of said shell to enable said insert to be repositioned and removably placed therein and wherein said shell is further characterized as having a border surrounding said open region to substantially resist removal of said insert from said open region wherein said bottom panel is smaller than said top panel and wherein first and second cat scratching surfaces are appended to a supporting substrate, said first and second cat scratching surfaces and supporting substrate being insertable within said shell as said insert.

6. A cat scratcher system for providing at least one surface suitable for cat scratching, said system comprising an insert having at least one cat scratching surface and a shell, said shell being capable of accepting said insert, said shell further having a top panel, a bottom panel and side panels, at least one of said panels being provided with an open region for displaying said at least one cat scratching surface to the exterior of said shell and access being provided to the interior of said shell to enable said insert to be repositioned and removably placed therein and wherein said shell is further characterized as having a border surrounding said open region to substantially resist removal of said insert from said open region and wherein said shell is provided with means for supporting said shell in a selected location or orientation and wherein said selected location or orientation comprises a vertical surface and wherein said vertical surface is a door and wherein said cord, appended to said shell, is sized to pass beneath a door and is attached to a knob of the door to prevent said cat scratcher system to be moved from said door during use by a cat.

7. A cat scratcher system for providing at least one surface suitable fox cat scratching, said system comprising an insert having at least one cat scratching surface and a shell, said shell being capable of accepting said insert, said shell further having a top panel, a bottom panel and side panels, at least one of said panels being provided with an open region for displaying said at least one cat scratching surface to the exterior of said shell and access being provided to the interior of said shell to enable said insert to be repositioned and removably placed therein and wherein said shell is further characterized as having a border surrounding said open region to substantially resist removal of said insert from said open region and wherein said shell is provided with means fox supporting said shell in a selected location or orientation and wherein said means for supporting said shell comprises a member selected from the group consisting of screws, nails, tacks, staples, string, wire, cord, non-slip strips, rubber feet, tape, hooks, loops and suction cups and wherein openings are configured within said shell for enabling attachment means to pass therethrough.

8. A cat scratcher system for providing at least one surface suitable for cat scratching, said system comprising an insert having at least one cat scratching surface and a shell, said shell being capable of accepting said insert, said shell further having a top panel, a bottom panel and side panels, at least one of said panels being provided with an open region for displaying said at least one cat scratching surface to the exterior of said shell and access being provided to the interior of said shell to enable said insert to be repositioned and removably placed therein and wherein a non-slip strip, screws, nails, tape or suction cups are secured to said shell in a location such that this would contact said floor when said cat scratcher system is positioned diagonally to said floor and wall to reduce slippage of said cat scratcher system from its diagonal orientation.

9. A cat scratcher system for providing at least one surface suitable for cat scratching, said system comprising an insert having at least one cat scratching surface and a shell, said shell being capable of accepting said insert, said shell further having a top panel, a bottom panel and side panels, at least one of said panels being provided with an open region for displaying said at least one cat scratching surface to the exterior of said shell and access being provided to the interior of said shell to enable said insert to be repositioned and removably placed therein and wherein said shell is further comprising a swat toy emanating flow at least one of said panels of said shell.

10. The cat scratcher system of claim 9 wherein said swat toy is appended to said at least one of said panels by hook and loop fasteners.

11. The cat scratcher system of claim 9 wherein said swat toy is appended to polling configured within at least one of said panels.

12. A cat scratcher system for providing at least one surface suitable for cat scratching, said system comprising an insert having at least one cat scratching surface and a shell, said shell being capable of accepting said insert, said shell further having a top panel, a bottom panel and side panels, at least one of said panels being provided with an open region for displaying said at least one ear scratching surface to the exterior of said shell and access being provided to the interior of said shell to enable said insert to be repositioned and removably placed therein and wherein said insert is of a smaller internal dimension than said shell so that upon insertion, said insert occupies less than the entire internal volume of said shell and wherein that portion of said internal volume not occupied by said insert is maintained as a storage compartment within said shell.

13. The cat scratcher system of claim 12 wherein said storage compartment houses a quantity of catnip therein.

14. The cat scratcher system of claim 13 wherein upon closing said insert within said shell, said catnip is inaccessible to the exterior of said shell unless or until said shell is opened.

15. The cat scratcher system of claim 12 wherein said storage compartment houses hardware elements suitable for attaching said cat scratcher system to other cat scratcher systems or to supporting surfaces.

16. A cat scratcher system for providing at least one surface suitable for cat scratching, said system comprising an insert having at least one cat scratching surface and a shell, said shell being capable of accepting said insert, said shell further having a top panel, a bottom panel and side panels, at least one of said panels being provided with an open region for displaying said at least one cat scratching surface to the exterior of said shell and access being provided to the interior of said shell to enable said insert to be repositioned and removably placed therein and further comprising at least two shells wherein at least one panel of said each shell is provided with openings and bridging means sized to pass within said openings, said bridging means being sized and said openings being positioned such that said at least two shells are capable of being appended to one another.

17. The cat scratcher system of claim 16 wherein four shells are connected to one another to provide a rectangular structure.

18. The cat scratcher system of claim 17 wherein said rectangular structure is characterized as having an open area confined by said four shells.

19. The cat scratcher system of claim 18 wherein said open area is substantially filled by a cushion to create a bed for a cat using the present cat scratcher system.

* * * * *